United States Patent
Paulsohn

(10) Patent No.: US 10,299,487 B2
(45) Date of Patent: May 28, 2019

(54) FISH DELIVERY DEVICE, FISH-TRANSFER SYSTEM EQUIPPED WITH SAID FISH DELIVERY DEVICE, AND METHOD FOR THE AUTOMATED DELIVERY OF FISH TO A FISH PROCESSING DEVICE

(71) Applicant: Nordischer Maschinenbau Rud. Baader GmbH + Co. KG, Lubeck (DE)

(72) Inventor: Carsten Paulsohn, Lubeck (DE)

(73) Assignee: Nordischer Maschinenbau Rud. Baader Gmbh + Co. KG, Lubeck (DE)

( * ) Notice: Subject to any disclaimer, the term of this patent is extended or adjusted under 35 U.S.C. 154(b) by 0 days.

(21) Appl. No.: 15/578,175

(22) PCT Filed: May 29, 2015

(86) PCT No.: PCT/EP2015/061993
§ 371 (c)(1),
(2) Date: Nov. 29, 2017

(87) PCT Pub. No.: WO2016/192756
PCT Pub. Date: Dec. 8, 2016

(65) Prior Publication Data
US 2018/0160692 A1    Jun. 14, 2018

(51) Int. Cl.
A22C 25/00    (2006.01)
A22C 25/08    (2006.01)
A22C 25/12    (2006.01)

(52) U.S. Cl.
CPC .............. *A22C 25/08* (2013.01); *A22C 25/12* (2013.01)

(58) Field of Classification Search
CPC ....... A22C 25/00; A22C 25/08; A22C 25/145; A22C 25/18

(Continued)

(56) References Cited

U.S. PATENT DOCUMENTS 3,838,478 A * 10/1974 Wulff ..................... A22C 25/08
452/119
4,037,294 A * 7/1977 Cowie .................... A22C 25/16
452/136

(Continued)

FOREIGN PATENT DOCUMENTS

CA    2739970 A1    7/2010
CN    102223805    10/2011

(Continued)

OTHER PUBLICATIONS

International Preliminary Report on Patentability dated Dec. 5, 2017 from International Patent Application No. PCT/2015/061993 filed May 29, 2016.

(Continued)

*Primary Examiner* — Richard T Price, Jr.
(74) *Attorney, Agent, or Firm* — David B. Tingey; Bryant J. Keller; Kirton McConkie

(57) ABSTRACT

A fish feed-in device (1) for feeding fish (9) to a fish processing device (7) comprises a delivery conveying means (3) which is equipped with a controllable positioning drive (35) and a controllable conveying drive (36). The delivery conveying means (3) can be moved by the controllable positioning drive (35) into a first state (301) released by the fish (9) in a deposit space (11), into a second state (302) for grasping, centered holding and conveying of the fish (9) accessing said fish in the deposit space (11) and, in cooperation with the controllable conveying drive (36), into a third state (303) which releases the fish (9) after conveying at a fish delivery point (42) which is defined by a controlled delivery time with associated controlled fish delivery speed.

31 Claims, 5 Drawing Sheets

(58) Field of Classification Search
USPC .................. 452/149–153, 160–162, 165, 170
See application file for complete search history.

(56) References Cited

U.S. PATENT DOCUMENTS

| | | | |
|---|---|---|---|
| 4,270,650 A | | 6/1981 | Krohn |
| 5,378,194 A | | 1/1995 | Hjorth |
| 5,702,295 A | | 12/1997 | Ketels |
| 5,980,376 A | | 11/1999 | Grossholz et al. |
| 6,361,426 B1 | | 3/2002 | Kragh |
| 6,572,466 B1 | * | 6/2003 | Del Ser Gonzalez ............... A22C 25/17 452/127 |
| 7,076,202 B1 | * | 7/2006 | Billmaier ........... H04N 5/44543 348/E5.105 |
| 7,179,163 B1 | * | 2/2007 | Vedsted ................. A22C 25/14 452/121 |
| 7,828,635 B2 | * | 11/2010 | Paulsohn ............. A22C 25/147 452/116 |
| 8,512,106 B2 | * | 8/2013 | Ryan ..................... A22C 25/147 452/121 |
| 8,814,637 B2 | * | 8/2014 | Jurs ........................ A22C 25/16 452/162 |
| 8,986,077 B1 | * | 3/2015 | Ryan ..................... A22C 25/145 452/57 |
| 2005/0009463 A1 | | 1/2005 | Grosseholz et al. |

FOREIGN PATENT DOCUMENTS

| | | |
|---|---|---|
| CN | 203388169 U | 1/2014 |
| CN | 203872900 U | 10/2014 |
| DE | 2939625 A1 | 4/1981 |
| DE | 225326 A1 | 7/1985 |
| DE | 69617746 T2 | 8/1995 |
| DE | 19522238 A1 | 1/1997 |
| DE | 19829376 A1 | 2/1999 |
| GB | 1495482 A | 12/1977 |
| SU | 1752308 A1 | 2/1990 |
| WO | 03/013262 A1 | 3/2003 |

OTHER PUBLICATIONS

Office Action and Search Report dated Jan. 17, 2018 from Canadian Patent Application No. 2985671 filed May 29, 2015.

International Search Report dated Jan. 25, 2016 from International Patent Application No. PCT/2015/061993 filed May 29, 2016.

* cited by examiner

FISH DELIVERY DEVICE, FISH-TRANSFER SYSTEM EQUIPPED WITH SAID FISH DELIVERY DEVICE, AND METHOD FOR THE AUTOMATED DELIVERY OF FISH TO A FISH PROCESSING DEVICE

CROSS REFERENCE TO RELATED APPLICATION(S)

This application is a U.S. National Stage Entry of International Patent Application No. PCT/EP2015/061993, filed May 29, 2015, the disclosure of which is hereby incorporated entirely herein by reference.

BACKGROUND

Technical Field

The invention relates to a fish feed-in device, configured for the automatic serial receipt and delivery of fish for feeding the fish to a fish processing device, comprising a deposit space receiving each fish in the longitudinal position, a delivery conveying means, which grasps and holds the fish in said longitudinal position, with which the fish can be conveyed for successive delivery in the longitudinal position in a delivery conveying direction corresponding to the longitudinal position. The invention also relates to a fish transfer system, configured for serially transferring fish to a fish processing device, comprising the fish feed-in device and a processing conveying means, which serially transfers the fish from the fish feed-in device at a fish receiving point, said processing conveying means having fish carrier elements spaced along a processing conveying path, said carrier elements each being configured at the fish receiving point for receiving, and along the conveying path for transporting a fish, wherein a fish delivery point of the fish feed-in device is assigned to the fish receiving point. In a method that also relates to the invention, the fish are serially fed to a fish processing device, wherein the fish are brought individually into a holding position with longitudinal orientation at a deposit point and are conveyed with a delivery conveying means along a delivery conveying path and at a fish delivery point are serially fed to an associated fish receiving point, the fish passing the fish carrier elements of a processing conveying means of the fish processing device for transferring the fish.

State of the Art

Fish that are processed in a fish processing device or are transported for processing must be specially positioned. The processing covers any handling or treatment. Fish are also fish torsos, for example fish with the head removed. A fish processing device is understood to mean any device which is equipped with a processing conveying means, which serially receives fish from a fish feed-in device, holds them in a processing position and, maintaining the position, conveys them further for processing. Such a fish processing device is, for example, part of a fish processing machine, in particular a slaughter machine or a gutting machine. In particular, an overall plant comprises a plurality of processing machines which are linked to each other by a conveying system. For example, in the course of an overall conveying route, a fish to be processed must pass successively through different processing machines for carrying out different processing procedures. Frequently, the fish have to be conveyed between different conveying means of the processing devices to transfer from one processing device to another processing device. For processing in a single fish processing machine and, in particular, in a plurality of fish processing machines of the overall plant within an overall conveying process, it is essential that the fish be positioned as accurately as possible with regard to position and time and in respect of organs or tools which engage on each fish. Any inaccuracy or even malfunction when feeding the fish into a fish processing device leads to consequences which impair the processing process culminating in unusable processing results and machine breakdown. A particular vulnerability such as this exists when, as is generally desired, high processing speeds and/or throughput rates are to be achieved. For example, the feeding of fish to be processed from a load conveyor, such as a conveyor belt, to a processing conveying means of a slaughter/gutting machine directly affects the slaughtering result and therefore the cleaning quality of the abdominal cavity of the fish. To ensure that cleaning tools achieve a high degree of effectiveness, every fish must arrive in the fish processing device in a particularly defined position and be conveyed through it.

Various devices for feeding fish to a processing device, that is for transferring fish between different conveying means, have become known.

DE 29 39 625 A1 and DE 195 22 238 A1 disclose fish transfer systems with a transverse conveyor (loading means) and a longitudinal conveyor. The transverse conveyor has a timed trough conveyor, from which fish are transferred to the longitudinal conveyor and conveyed further in the longitudinal orientation. The longitudinal conveyor is formed by two flank conveyors arranged in parallel. A transport means, to which the fish are discharged and on which they are positioned at the same time, is formed by a bottom belt between the flank conveyors, said belt being provided with receptacles and support elements onto which the fish are to be discharged in step with loading using the transverse conveyor, while at the same time being placed on a feed chute formed by the flank conveyors. Unlike DE 29 39 625 A1, according to DE 195 22 238 A1, a collecting element is arranged between the transverse conveyor and the flank conveyors, said element being controlled to discharge each fish onto the activated flank conveyor, wherein for controlling, a feeding cycle of the supporting conveyor corrected with regard to a uniform position of fish abdominal cavities is generated by a program-controlled computer which is activated with a fish-size-dependent control signal. The two known fish transfer systems have in common that the conveying means of the fish processing device is to be guided through between the flank conveyors which engage the fish when the fish is discharged. A primary fish orientation is influenced by the active flank conveyors. In each case, the processing conveying means has to be integrated in the longitudinal conveyor. Due to this design and by discharging the fish onto a conveying device with a plurality of active cooperating conveying means, the transfer remains susceptible to malfunction, the feed accuracy is restricted and the transfer speed is limited. There is an extensive dependency on the type and arrangement of the processing conveying means and therefore restriction on the transfer design and the design of machines or plants.

WO 03/013262 A1 discloses a fish transfer system which comprises a conveying means of a fish processing device and a loading means arranged transversely thereto. The loading means is formed by a clocking unit which is provided as a positioning aid for the fish and is arranged together with a clocking flap of the processing conveying means. Each fish lying in front of the clocking flap is discharged onto the fish processing device with its longitudinal axis parallel to a discharge edge of said fish processing device. This fish feeding also operates with the direct discharge of fish onto a processing conveying means which is integrated in the fish feed-in device. Due to the operating principle of the clocking flap, targeted transfer of fish into the conveying region of the processing conveying means and therefore also grasping of the fish by fish carrier elements of the processing conveying means is not sufficiently certain and precise. The number of fish to be processed per minute is limited. In particular, the feed-in device disclosed according to WO 03/013262 A1 is not suitable for optimum receiving with a processing conveying means which is equipped in each case with fish carrier elements that are formed by a clamping mechanism.

SUMMARY

The objects of the invention are to specify an automatic mechanical fish feeder, which is significantly improved in terms of operational reliability and accuracy, for transferring fish from a loading conveying means to a processing conveying means. It should also be possible to achieve the improvement with a relatively high fish feeding speed and with a defined orientation of the fish in the longitudinal position and in their plane of symmetry. It should be easily and universally possible to insert the fish feeder between different conveying means.

The objects of the invention are achieved with a fish feed-in device in conjunction with the features referred to hereinbefore in that the delivery conveying means is arranged and designed for immediate access to a fish located in the deposit space and is configured with a controllable positioning drive and a controllable conveying drive, which are controllable with at least one conveying control signal that is definitive for feeding the fish in an adjusted manner to a production site of a fish processing device, wherein the delivery conveying means can be moved by the controllable positioning drive into a first state released by the fish in the deposit space, into a grasping second state for grasping, centred holding and conveying of the fish in the deposit space and, in cooperation with the controllable conveying drive, into a third state which releases the fish, after conveying, at a fish delivery point which is defined by a controlled delivery time with associated controlled fish delivery speed.

In conjunction with the features of the fish transfer system referred to hereinbefore, this is formed in combination with the fish feed-in device according to the invention. The objects are also achieved in conjunction with the features of the method referred to hereinbefore in that the fish are brought into the holding position individually at the deposit point within a grasping region of the delivery conveying means, wherein in the holding position they are initially out of engagement with said delivery conveying means such that the delivery conveying means is controlled by an electrical control system according to at least one conveying control signal into a conveying grasp to the fish located in the holding position and that the fish grasped in the holding position is moved along the delivery conveying path to the fish delivery point and is there released, wherein the conveying grasp, the delivery conveying movement and the release are electrically controlled with a delivery time and a delivery speed, associated with each fish, consistent with the movement and position of the fish carrier elements which pass the fish receiving point.

A number of advantages are obtained according to the invention. Each fish is brought into a deposit position and therefore into a resting/holding position which stabilizes the feeding operation in that the delivery conveying means is out of engagement with the fish during the deposit position in the first state but then by controlled establishment of the second state directly grasps the fish located in the deposit space for delivery conveying. At the same time, the deposit space can be configured in such a manner that, before conveying, the fish comes to rest in the longitudinal position by said deposit space and advantageously also with a defined orientation of its plane of symmetry, in particular in a dorsal position or ventral position. Control of the grasping, namely in particular a defined grasping duration for the second state in conjunction with release of the fish by the third state, causes the fish to be released in a defined manner with a controlled delivery time and associated controlled fish delivery speed. Acceleration and the conveying speed of the fish by the delivery conveying means are specifically controlled. Release takes place simply by deactivating the delivery conveying means so that there is no need for any means that additionally engage on the fish. The fish delivery point can therefore be arranged on a processing device largely independently of the type of processing conveying means and can be provided with a selectable orientation for adapting to different fish carrier elements of a processing conveying means. By means of the fish delivery point provided according to the invention, optimum accuracy and operational reliability of the controlled delivery is achieved even for relatively high conveying speeds of the processing conveying means. In particular, the fish feed-in device according to the invention can be used in fish processing plants with a plurality of fish processing machines, such as are basically known, for example, from WO 03/013262 A1. Using the combined position and grasping control system of the delivery conveying means, it is generally possible, in terms of accuracy, speed and operational reliability, to substantially improve the delivery control of oriented fish, which are to be transferred serially with respect to time and local positioning, in order to transfer them to fish carrier elements of a processing conveying means.

The positioning drive and the conveying drive of the fish feed-in device are expediently connected to an electrical control means which can be acted upon by at least one said conveying control signal. A preferred design consists in that the control of the delivery speed is adapted to at least one passing speed of carrier elements of a processing conveying means of a fish processing device. Advantageously, the delivery speed at the fish delivery point, which coincides with a fish receiving point of the fish processing device, is at least substantially identical to the speed of the processing conveying means. The delivery conveying means and the processing conveying means are then arranged at the same height or the same height range with corresponding running direction (conveying direction). It is achieved that the fish carrier elements and the fish to be transferred or received end up in an optimal receiving-operative connection. The device and the control are such that the operative connection is established in particular when the delivery conveying means is still in the second state which is grasping the fish. By bringing about the third state, the delivered fish ends up in the conveying for processing unimpeded, that is without being influenced by an additional delivery conveying means or an additional mechanism grasping the fish.

Even though the electrical control means, for example, can be controlled indirectly by a fish processing device, namely by at least one predetermined parameter for executing a control program, the electrical control means can be controlled expediently with at least one conveying control signal which can be picked up from the fish processing device.

A preferred and especially advantageous design consists in that the fish delivery point is determined by a delivery conveying path which starts at a reference point that is assigned to a uniform fish position and ends with a defined conveying length at the fish delivery point. The reference point assigned to the uniform fish position is expediently determined by a position sensor means which detects, for each fish, the position of a defined body point common to all fish of a species and generates a corresponding said conveying control signal. A preferred measure consists in that the position sensor means is configured to detect uniform access points of the fish which are assigned to the common body points, with which fish carrier elements of a conveying means of a fish processing device can be brought into engagement. A preferred design consists in that the position sensor means is configured to detect the tail roots which form the common body points of fish conveyed tail-first. A corresponding preferred design of the fish transfer system consists in that the fish carrier elements are each formed by a clamping mechanism which clamps the fish, which is conveyed tail-first, at the fish tail and carries it along for processing transport. Such tail clamping is known, for example, from DE 198 29 376 A1. In particular, the processing conveying means is formed by a continuously rotating chain conveyor which is guided around two deflection wheels and is equipped with fish receptacles, said receptacles consisting of a number of supporting segments, such as supporting prisms, which are adapted to the back geometry of the fish and have the clamping mechanism at their leading end, the clamping mechanism being formed from a pair of clamping jaws which can be controlled with regard to their mutual distance.

Even though any delivery conveying means which can be put by a control system into three states for grasping and releasing each fish is suitable for the purposes of the invention, a preferred and expedient arrangement consists in that the delivery conveying means has two conveying elements which are formed by a pair of flank conveyors, which are adjustable in distance by the positioning drive and can be moved apart into an inactive opening distance for conveying, transverse to the fish conveying direction, to establish the first condition and the third condition and can be moved towards each other into an active closing distance for conveying, transverse to the fish conveying direction, to establish the second state, wherein in the second state they come to rest against the flanks of a fish, in particular in such a manner that the fish come to lie in a position with an upright fish symmetry plane. Advantageously, the controlled positioning drive is configured in such a manner that the two flank conveyors can be moved synchronously to preferably change the distance between the flank conveyors equidistantly. The flank conveyors are expediently formed by revolving conveyors which can be driven at the same flank speed.

The deposit space expediently has a deposit means which forms a resting/holding place which receives the fish in the first state and while establishing and reaching the second state of the delivery conveying means. The deposit space, in particular with the deposit means, is preferably formed with a profile that is adapted to a cross-sectional profile of the fish in such a manner that every fish ends up or can be placed in an upright position, in particular in a centred position with upright fish symmetry plane.

An advantageous design consists in that the fish feed-in device is preferably equipped with a fixed, that is to say with a sliding guide device which forms a non-dynamic, stationary sliding system for the fish, which sliding guide device orients the fish for delivery and during delivery. In general, a guide device is expediently formed in the region of the deposit space by a deposit means which orients the fish as well as in the region of the delivery conveying means by a guide means holding the fish in the oriented position. In a preferred embodiment, the sliding guide device comprises a fixedly arranged sliding guide rail which, in an upstream section, forms the deposit means that can be loaded from above. Advantageously, a downstream section of the sliding guide rail, into which the upstream section merges, is designed as a fixed support conveying element which receives the fish on the underside. A preferred design also consists in that the fixed support conveying element protrudes freely on the delivery conveying means with a transfer section in the delivery conveying direction and ends in a fish transfer area.

Particularly in conjunction with alignment and sliding guidance of the fish by the sliding guide device, it becomes possible for flank conveyors to be configured with conveyor belts whose contact surfaces, which as such come to rest in contact with the conveyed fish, are at least substantially parallel to each other, in particular are vertically aligned. One advantage consists in that as a result the flank conveyors establish a particularly effective access to the fish, whereby they only support the orientation which is primarily effected by the sliding guide device. Particularly in conjunction with said sliding guide device, a device with which the flank conveyors are held so as to be deflectable against transversely directed, longitudinally distributed contact force is also advantageous for snug longitudinal contact with a fish to be conveyed.

A further advantageous design of the sliding guide device, which forms a fixed sliding system for the fish, consists in that said sliding guide device is equipped with a fixed upper guiding device comprising two opposing stationary sliding guide walls against which the fish ends up for lateral sliding guide contact. The upper guiding device also orients the fish before conveying starts and guides it during conveying. Advantageously, the sliding guide walls are arranged and held so as to be deflectable against the restoring force in such a manner that they assume variable positions adapted to the fish size for smooth-running sliding guidance of the fish. The upper guiding device also expediently comprises the deposit space or the deposit means. A loading element feeding the fish into the deposit space or onto the deposit means, in particular a controlled flap element, is then arranged above the upper guiding device.

Even though the sliding guide device, particularly in conjunction with the flank conveyors, is especially advantageous, it is also possible for the delivery conveying device to be configured with a bottom conveying means which supports and orients the fish for conveying, said bottom conveying means being operable at a conveying speed which corresponds to a conveying speed of the fish effected by the flank conveyors.

In general, the fish feed-in device, for loading the deposit space with fish, has a loading means which is formed by a load conveyor that opens into the deposit space and is configured in such a manner that the fish conveyed up to it for loading can be conveyed direction-oriented into the deposit space individually and successively, for example tail-first in the longitudinal position.

The load conveyor is expediently arranged with the loading direction transverse to the delivery conveying direction. A loading device configured for serially feeding and depositing fish in the deposit space, which may be a component of the fish feed-in device and/or the loading means, for example a flap element letting the fish through individually by closing and opening, can be equipped with a controllable loading drive which can be controlled with at least one conveying control signal which can be picked up from a fish processing device.

Advantageously, the electrical control means in conjunction with the fish processing device is configured such that the at least one conveying control signal detects the speed of the fish carrier elements as well as their chronological passing of the fish receiving point. Advantageously, the device is preferably such that the fish delivery speed at the fish delivery point is correlated with the speed of an assigned fish carrier element at the fish receiving point.

The fish carrier elements are each formed in particular, as described above, by a clamping mechanism which grasps the fish tail of a fish lying on its back or abdomen which is conveyed tail-first. The invention is not limited to such fish carrier elements. The fish carrier elements can generally be formed by fish holding elements of a processing conveying means which receive, hold and transport a fish accurately positioned with respect to the uniform body point. For example, support elements, particularly in the form of sliding saddles, come into consideration, each of which engage accurately positioned in the abdominal cavity of a fish. Furthermore, troughs or concave recesses, which hold and transport each fish in an accurate position, are possible per se or additionally.

One design of the fish transfer system consists in that a transfer section is configured between the delivery conveying means and the fish receiving point which orients the fish, while it is being conveyed by the delivery conveying means, to an assigned carrier element at the fish receiving point. Advantageously, the end of a conveying path of the delivery conveying means, in particular said transfer section, is aligned at least substantially tangential to the running path of the processing conveying means of the fish processing device. A preferred design of the method according to the invention consists in that the delivery speed is adapted to at least one associated passing speed of the carrier elements at the fish receiving point. In particular, a transfer in the manner of passing on a baton is achieved, wherein the incoming delivery conveying direction substantially coincides with the outgoing transport direction of the processing conveying means. In this case, and also in principle, the fish receiving point is considered to be the point which coincides with the fish delivery point. The transfer is not limited to a substantially identical alignment of the delivery conveying direction and the processing conveying direction at the fish receiving point. What is important is that the fish comes to rest at the common delivery/receiving point at the exact same time and in the exact same position at or above the associated fish carrier element. The transfer movement can take place by a (tangential) longitudinal movement but also, if necessary in combination, by a translational or curved transverse movement at right angles to the loading conveying direction.

In correspondence with a design of the fish feed-in device or the fish transfer system, a fish body point, which is common to all fish of a species, is detected for carrying out the process by means of a position sensor means for controlled delivery conveying, wherein a defined delivery conveying path terminates at the fish delivery point and starts with a path beginning which defines a reference point and the fish body point is detected by a position sensor means with respect to the path beginning. For example, in the event that a measurement is carried out on the moving fish, a control variable can be measured at a path beginning with a position sensor means, said path beginning then forming a measuring reference point for the uniform fish body point.

A preferred embodiment consists in that the fish pass the position sensor means for detecting the fish body point. However, fish body points which come to rest variably in the resting position in the deposit space can also be detected and measured by a scanning sensor device in the region of the deposit space, namely with respect to a fixed basic position defined for control which then defines the beginning of the conveying path with a positional variation detected for this purpose and taken into account for conveying control.

An especially designed procedural measure consists in that the controlled delivery of the fish at the fish delivery point is operated, at least temporarily, intermittently in such a manner that the fish delivery speed at the time of delivery is zero or lower than or higher than the delivery conveying speed prior to delivery. The controlled delivery of the fish can also be operated, at least temporarily, in such a manner that the delivery conveying speed of the delivery conveying means at the time of delivery is lower than or higher than a processing conveying speed of the fish carrier elements of a fish processing device.

A further design consists in that a receiving sensor means which cooperates with the control is arranged at the fish receiving point and detects receipt of the fish, wherein in the event of a fish transfer to a fish carrier element not being carried out, the delivery conveying means is controlled and operated in such a manner that the fish is held at the fish delivery point until the associated release for transfer to a subsequent fish carrier element, if necessary with an offset of the fish delivery point in or against the delivery conveying direction.

Advantageously, a fish not transferred to a fish carrier element at the fish receiving point is released from the conveying process for ejection and discharged. This can take place in that the sliding guide device described above, or another guiding device conveying the fish or holding it in the delivery position, is configured with an ejection device in such a manner that it releases the fish. Instead of such a release, a device can also be of such a kind that the delivery conveying means in engagement with the fish is controlled in the opposite conveying direction and the deposit space is configured to carry the returned fish through and out. Another measure consists in that a fish which is not correctly grasped by a fish carrier element is carried along by the processing conveying means, and a discharge means, to which the fish to be discharged is fed, is arranged on the processing conveying means. The control can be such that a fish which is still located at the fish deposit point is released for ejection and deposited on the processing conveying means. A receiving sensor means, which identifies the wrong position on the processing conveying means and emits a corresponding malfunction control signal, can be arranged at the fish receiving point.

BRIEF DESCRIPTION OF THE DRAWINGS

Dependent claims are directed at the said embodiments and also other expedient and advantageous embodiments of the invention. Only particularly expedient and advantageous embodiments or embodiment options will be described in greater detail, based on the following description of the embodiments illustrated in the schematic drawing. Each individual or detail design described within an embodiment should be understood as a structurally independent detail example for other embodiments and designs which fall within the invention that are not described or not fully described. Designs or features which have a higher-level independent relevance are highlighted in particular by the term "general".

The drawings show.

DETAILED DESCRIPTION OF EMBODIMENTS

Figure 1:
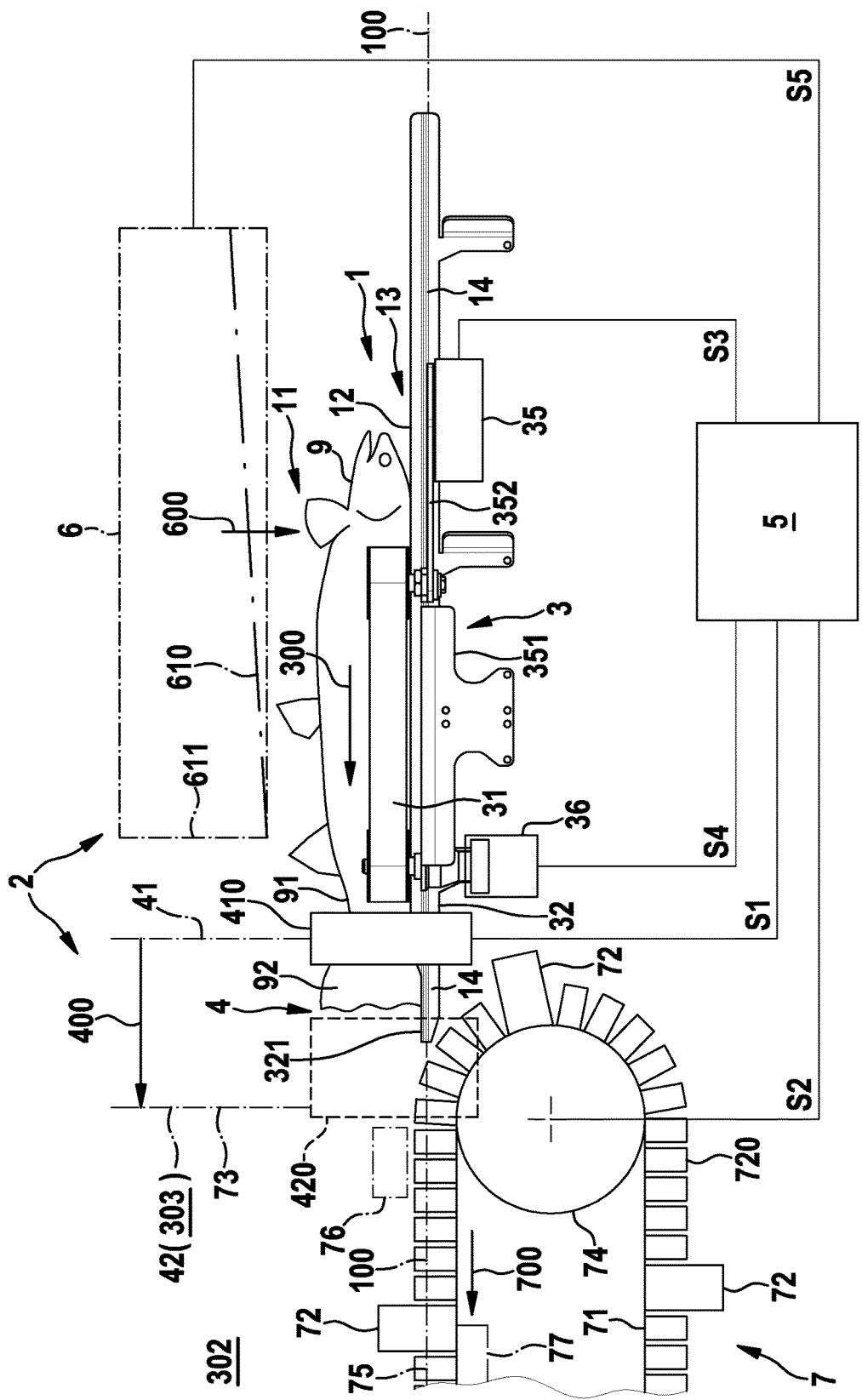
FIG. 1 in longitudinal view, a fish transfer system according to the invention with a fish feed-in device according to the invention in the conveying state and FIGS. 2A-2D a fish feed-in device according to the invention with FIGS. 2A & 2B in axonometric front longitudinal view with a delivery conveying means in inactive (FIG. 2A) and active (FIG. 2B) position, FIG. 2C in axonometric rear longitudinal view with the delivery conveying means in inactive position and FIG. 2D in axonometric rear face view with the delivery conveying means in active position.

As can be seen from FIG. 1, a fish transfer system 2 according to the invention is formed by a fish feed-in device 1 according to the invention and a fish processing device 7 downstream thereof. A loading means 6 with a load conveyor 61 and a loading device 62 is arranged on a frontal longitudinal side (front longitudinal side) of the fish feed-in device 1. The loading means 6 is only illustrated schematically in FIG. 1 and is described in greater detail with FIGS. 2A to 2D. The devices and components are arranged, supported and attached to frames, brackets, housings or similar means which are not illustrated.

The fish transfer system 2 is equipped with an electrical control device 5 which in particular forms a component of the fish feed-in device 1 and is incorporated in the fish transfer system 2 via signal paths, signal lines in the embodiment. An input control with control signals S1 and S2 is provided via first signal paths. A delivery conveying means 3 of the fish feed-in device 1 is activated by way of second signal paths with control signals S3 and S4. The loading means 6, namely the loading device 62, is activated with a control signal S5 via a third signal path.

The fish feed-in device 1, which extends with an apparatus length, is described in greater detail with reference to FIGS. 2A to 2D. It comprises a deposit space 11 which receives fish 9 individually in the longitudinal position, said deposit space being configured and arranged to serially receive fish 9 individually from the controlled loading device 62. The deposit space 11 comprises a deposit means 12 extending in the apparatus length with a V-shaped bottom profile (see in particular FIG. 2D) which is adapted to the cross-sectional profile of the fish 9 such that each fish 9 can be placed in a centred position with upright fish symmetry plane. The deposit means 12 engages with one section in a conveying region of the delivery conveying means 3, which determines a delivery conveying direction 300, the delivery conveying means being formed by a longitudinal conveyor oriented in the apparatus length with which the longitudinally oriented fish 9 can be conveyed to a processing conveying means 71 of the fish processing device 7 for transferring said fish 9 to said fish processing device 7.

The loading means 6, which will be described in greater detail with reference to FIGS. 2A to 2D, comprises a load conveyor 61 assigned to the deposit means 12 and is formed by two base plates 610 arranged in a row, which are arranged above the deposit means 12 in front of a flap element 621, extending in the apparatus length, of the loading device 62. The base plates 610 and the flap element 621 are inclined slightly downwards in the delivery conveying direction when viewed in the apparatus length. The base plate 610 which adjoins the fish feed-in device 1, and the flap element 621 form a correspondingly obliquely oriented load space. The base plates 610 with loading direction 600 form a loading path arranged transverse to the apparatus length, said loading path being inclined downwards to promote slipping and receiving the fish 9 in the parallel position for loading the fish feed-in device 1. A feeding and orienting means, not shown, conveys the fish 9 in the parallel position into the load conveyor 61, wherein they are oriented such that they arrive in the dorsal position with their tail against an abutment 611 of the loading space which is only illustrated schematically in FIG. 1. By controlled opening and closing of the pivotably hinged flap element 621 by actuators 622, which are connected to the electrical control device 5, the fish 9 can be discharged serially onto the deposit means 12 in the longitudinal position, wherein the fish 9 comes to rest in the dorsal position and the fish tail points in the delivery conveying direction 300. In the drawing, the flap element 621 is illustrated in the closed position. The discharged fish 9 takes up a resting and holding position on the deposit means 12 in the deposit space 11, said position in FIG. 1 being upstream of the fish 9 illustrated therein underneath the loading means 6. Generally, the flap element 621 can be formed by any loading element which brings about discharge of the fish 9 by controlled opening and closing. The loading element can be a direct component of the fish feed-in device 1 and—as in the embodiment—can be arranged thereon.

A general design consists in that the longitudinal conveyor of the delivery conveying means 3 is formed by two flank conveyors 31 which are arranged in the apparatus length, opposite each other on a straight conveying path 100. In particular, the conveying path 100 has a guide rail 14 which is part of a stationary sliding guide device 140. An upstream section of the guide rail 14 forms the deposit means 12 which merges into a downstream guide rail section which, as part of the delivery conveying means 3, forms a fixed support conveying element 32, which protrudes freely on the delivery conveying means 3 with a transfer section 321 in the delivery conveying direction 300 and ends in a fish transfer area 420. In general, each flank conveyor 31 is formed by a revolving conveyor with a continuous conveyor belt 313 guided around a pair of rollers 312. Contact surfaces of the conveyor belts 313 directed towards each other along the conveying path 100 are essentially vertically oriented. During conveying, the fish come to lie on the guide rail 14 in sliding contact, wherein they are uniformly uprighted and oriented.

The flank conveyors 31 are connected to a positioning drive 35 and a conveying drive 36. The positioning drive 35 is configured for controllable positioning of the flank conveyors 31 in such a manner that said flank conveyors 31 can be moved apart and moved towards each other transversely to the conveying path 100 and at the level of the fish 9 to be conveyed. At the same time, the contact surfaces of the conveyor belts 313 remain essentially in the parallel position. The deflection rollers 311 and drive members, e.g. servomotors, of the conveying drive 36, which each drive one roller of the pair of rollers 312, are arranged on brackets 351, which are connected to the positioning drive 35 via a linkage 352 which is only partially shown in the drawing. In addition, the brackets 351 are arranged and mounted in such a manner that the flank conveyors 31 are held so as to be deflectable against crosswise contact force for snug longitudinal contact with the fish 9 to be conveyed.

Figure 2A:
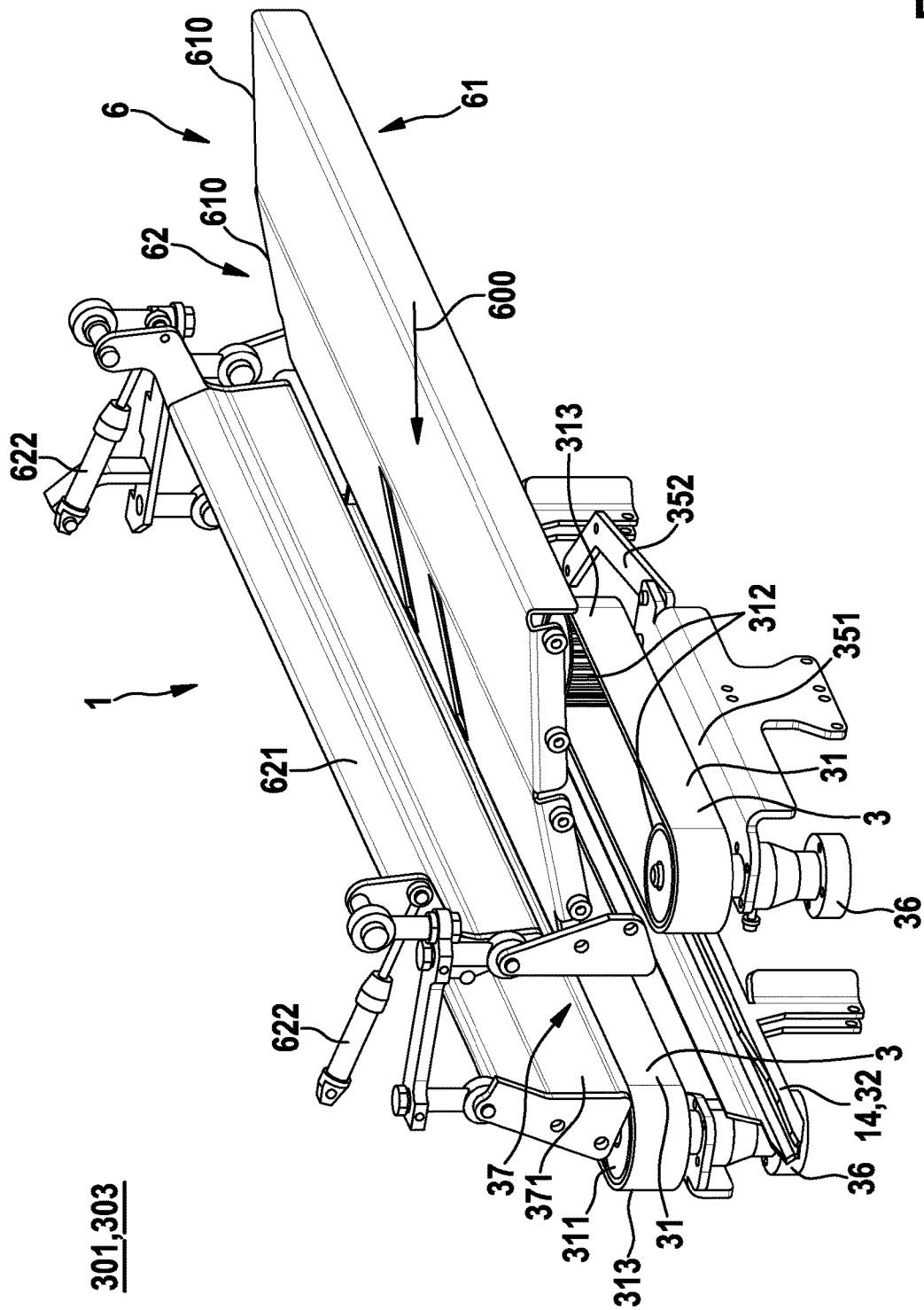
Figure 2B:
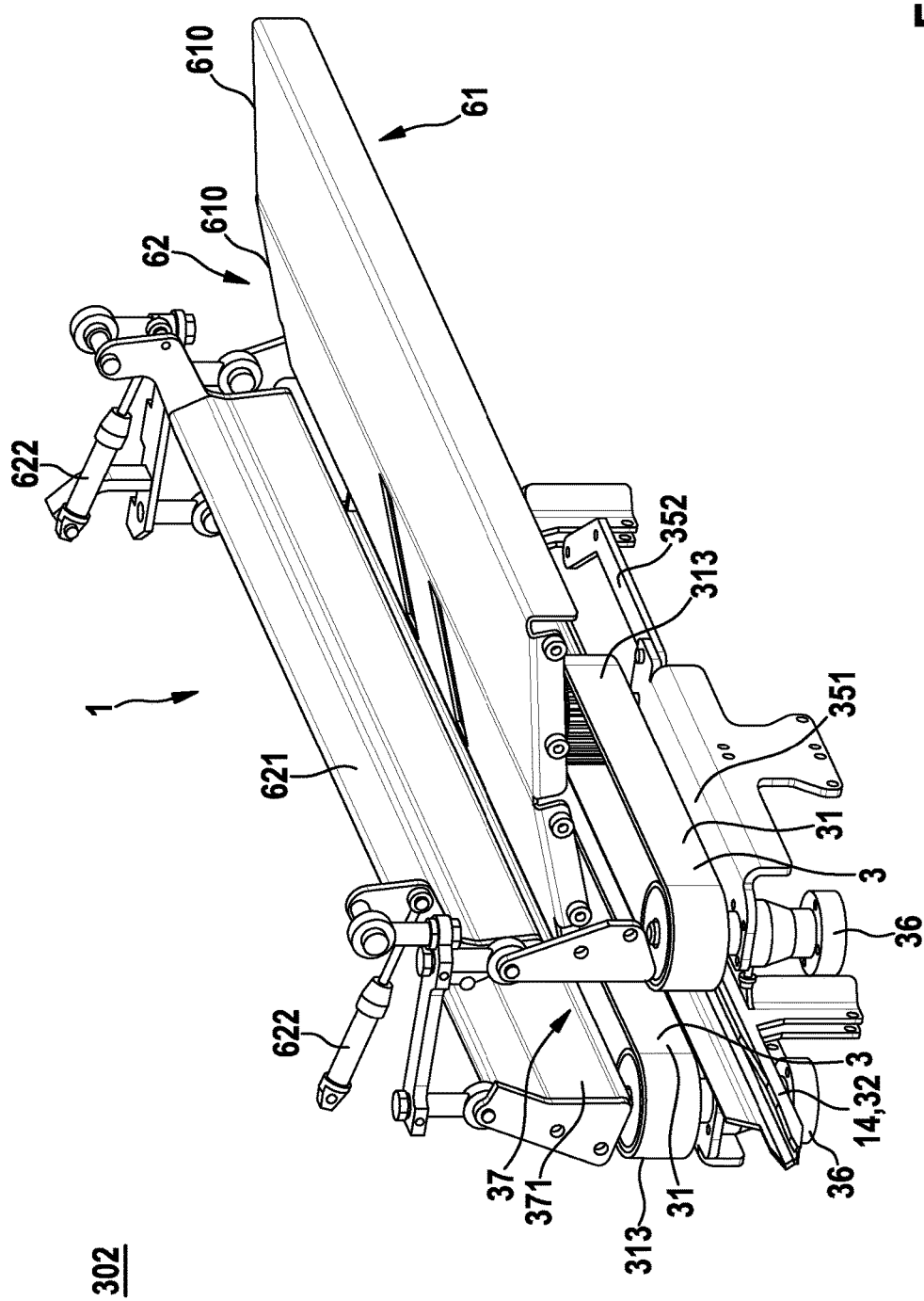
Figure 2C:
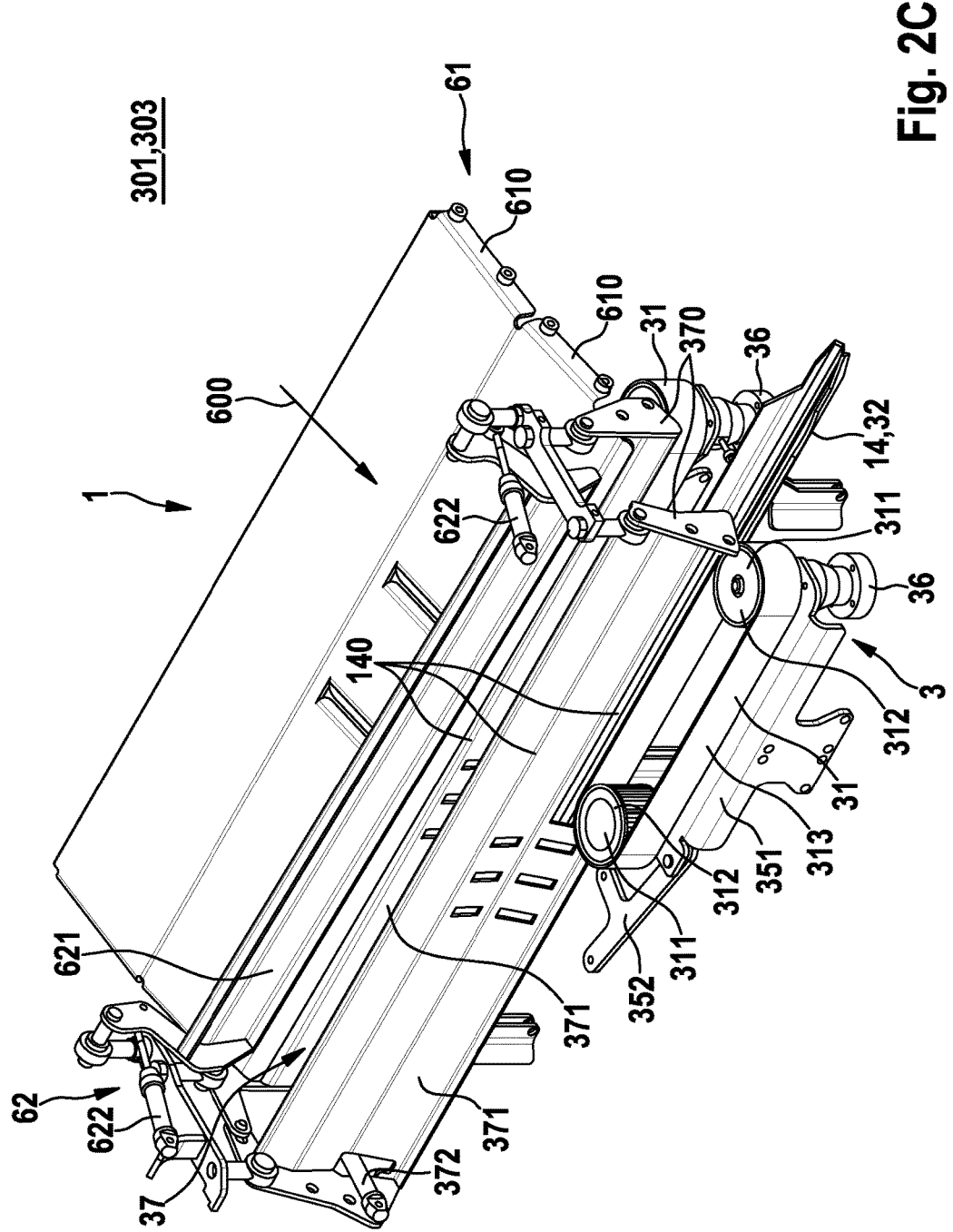

The electrical control device 5 controls the positioning drive 35 with the control signal S3 in such a manner that it puts the pair of flank conveyors 31 in three states. In a first state 301, which is illustrated in FIGS. 2A and 2C, the flank conveyors 31 are in a state in which they are spaced apart from each other, said state forming a portion of the deposit space 11 between said flank conveyors 31, wherein a fish 9 discharged into the deposit space 11 is released by the delivery conveying means 3. The contact surfaces of the conveyor belts 313 are then in an inactive (open) position out of conveying engagement with the lateral flanks of the fish 9.

In a second state 302, namely in an active (closed) position, the flank conveyors 31 directly grasp the fish 9 deposited in the deposit space 11. The contact surfaces of the conveyor belts 313 come to rest in contact with the flanks of the fish 9. The flank conveyors 31 are preferably brought uniformly into a mirror-image position to the conveying path 100 in such a manner that the fish 9, in addition to being oriented by the guide rail 14, is centred in its position with upright fish symmetry plane. In the second state 302, a grasped fish 9 can be accelerated and conveyed in the delivery conveying direction 300 at a delivery conveying speed controlled by the conveying drive 36. A position of the conveyed fish 9 is illustrated in FIG. 1.

A third state 303 which can be brought about by the control arises in that the delivery conveying means 3 is moved out of the second state 302 into an opening state in which the fish 9 is released. The flank conveyors 31 are preferably spaced equidistant from the conveying path 100 or the fish 9. The third state 303 brought about in said sequence of states corresponds to the first state 301. The conveying engagement of the delivery conveying means 3 on the fish 9 is cleared. The opened intermediate space between the flank conveyors 31 is available for deposit and conveying engagement for a subsequent fish 9.

In cooperation with said units and components, control of the states is particularly important. In general, it is essential that the fish 9 is conveyed by the delivery conveying means 3 to a defined fish delivery point 42. The fish delivery point 42 is a defined location at which a leading fish part is present at a defined time, wherein this fish delivery point 42 is basically to be viewed as a fixed point in respect of the conveying path 100 of the fish feed-in device 1. The fish delivery point 42 is further defined in that said fish part is not only present at the fish delivery point 42 at the defined time but also at this time (delivery time) the conveying engagement of the delivery conveying means 3 on the fish 9 is terminated by bringing about the state 303 in a controlled manner. According to the invention, the measures generally succeed in that a reference position of the fish 9 is detected as a control variable for controlling by the electrical control means 5 before the delivery conveying in the resting position of the fish and/or during the delivery conveying, wherein, according to specifications for a delivery time, conveying and release of the fish 9 are controlled in combination by the conveying drive 36 and the positioning drive 35.

Various control patterns with specifications or control variables can be chosen. A control sequence consists in that then, when a fish reference part reaches the fish delivery point 42, at this time (local time) conveying is stopped by the conveying drive 36 so that the fish 9 rests in a position on the guide rail 14, with—in the example—a fish part, namely the fish tail, protruding at the support conveying element 32. The fish delivery speed at the time of delivery is then zero. The control can be such that the local time coincides with the fish delivery time—release by bringing about the third state 303. However, the fish delivery point can also follow chronologically controlled.

A control sequence consists in that the conveying drive 36 is controlled such that a fish reference part has a speed that is greater than zero at the fish delivery time at the fish delivery point 42. Advantageously, the control can be chosen such that the fish delivery speed essentially coincides with the speed of the processing conveying means 71 of the fish processing device 7, the difference between the two speeds thus being zero or as low as possible. The control can also be such that the fish delivery speed can be made specifically lower or higher than the speed of the conveying means 71 of the fish processing device 7 by correspondingly controlling the conveying drive 36.

The control is not restricted to said control sequences separately or in combination. In particular, the electrical control means 5 can be used to configure every control which combines the control of the positioning drive 35 and the control of the conveying drive 36 with each other, wherein mixed forms in particular of said control sequences can be provided. The electrical control means 5 can be formed by any conventional computer-operated or computer-assisted control device provided, for example, with suitable interfaces, which controls and/or regulates the sequences and states dependent on determined control variables, functions and/or programs. Conventional processors can be used. The control means can be part of the system, a complete system or machine or, as in the embodiment, be provided as part of the fish feed-in device 1. Components of the control means 5 can be allocated to operating/functional areas of the fish transfer system 2 and be operated in operative connection.

In the embodiment, the fish reference portion is the fish tail which forms an access point 92 at which the fish is grasped by a fish carrier element 72 for conveying in the fish processing device 7. The access point 92 is determined by a significant body point 91 associated with the fish tail, namely the tail root of the fish 9 which is conveyed tail-first. The tail roots are body points which are anatomically uniform and common to the fish 9. As a result, a uniform reference to body parts that are to be processed in a precise position is obtained for different and/or fluctuating fish sizes.

In the embodiment, a sensor 410 is arranged on the conveying path 100 at the beginning of the transfer section 321, which sensor detects the tail root immediately upon exiting the delivery conveying means 3 and transmits a corresponding control variable to the electrical control device 5 in the form of the signal S1. Said fish delivery point 42 is determined by a delivery conveying path 4 which starts at a reference point 41 and ends with a defined conveying length 400 at the fish delivery point 42. The reference point 41 is determined by the fixed point on the conveying path 100, at which the position sensor means 410 measures the passing of the tail root in terms of time and place. The position sensor means 410 can be formed by any means that detects a significant local point on the fish body. For example, a light barrier sensor is used. Other examples are conventional measuring tags which are deflected by the local point to be measured.

Figure 2D:
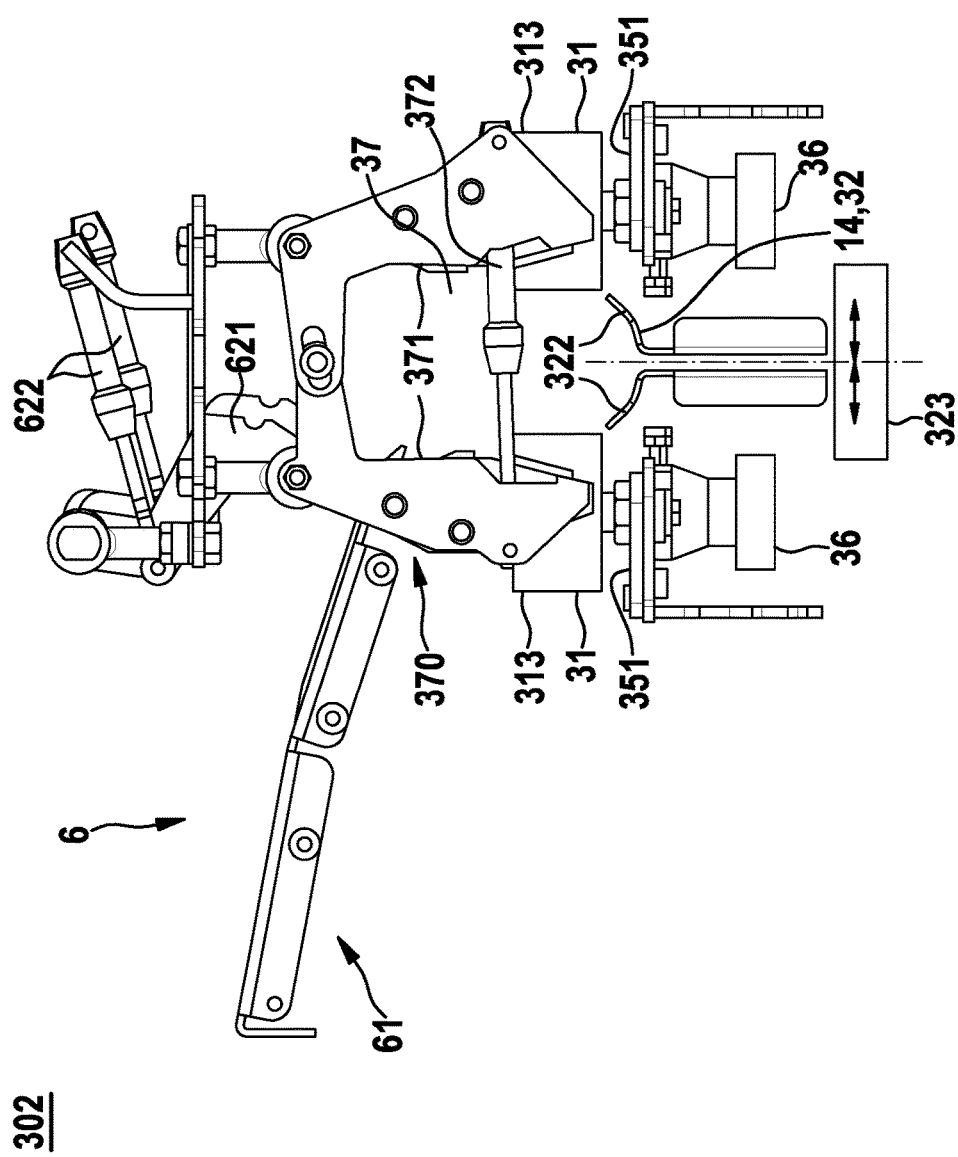

In the embodiment, an upper guiding device 370 of the sliding guide device 140 above the guide rail 14 is assigned to the guide rail 14 on which the conveyed fish 9 is oriented and slides, which upper guiding device, as can be seen in particular from FIGS. 2C and 2D, is constructed in a roof shape with two guide walls 371, which walls form between them a guiding/conveying space 37, slidingly guiding the fish 9 lying on its back in the abdominal region, and are cut out in the region of the flank conveyors 31. The upper guiding device 370 is not shown in FIG. 1. The guide walls 371 are pivotably hinged against the restoring force by an actuator 372 in such a manner that they assume variable positions adapted to the fish size for sliding guidance of the fish 9. The flap element 621 or another loading element, which brings about loading by opening and closing, is arranged above the upper guiding device 370 in such a manner that each fish arrives in the deposit space 11 from above, said deposit space being part of the guiding space 37 of the upper guiding device 370.

In the embodiment, the fish processing device 7 is illustrated with a conveying section essential for the fish transfer system 2, said conveying section being formed by the processing conveying means 71 in the form of a conventional continuous chain conveyor or similar. The latter is equipped with fish receptacles which, for example, consist of a series of supporting prisms 720 and have in each case, at their leading end, a clamping mechanism provided with a tail clamp which, for example, forms the fish carrier element 72.

The chain conveyor is deflected on a deflection roller 74 so that it runs along a processing conveying path 75 in transport direction 700. The support conveying element 32 is oriented with its transfer section 321 tangential to the crown region of the deflection roller 74, wherein the fish receptacles come to lie in a straight extension of the conveying path 100 of the fish feed-in device 1. Every fish carrier element 72 grasps a fish tail of the fish 9 conveyed in with the fish feed-in device 1 in the transfer area 420, which is largely free of the transfer section 321 and is provided in the region in front of the roller crown. The grasp of the fish carrier element 72 on the fish tail is completed at a fish receiving point 73. The fish receiving point 73 is considered to be the point which corresponds to the fish delivery point 42 and in particular coincides with it. The place, time and speed control already described at the fish delivery point 42 takes place in such a manner that the fish 9 is transferred with its tail accurately positioned and with controlled speed to the associated passing fish carrier element 72. In particular, as already described, the fish 9 is transferred with a substantially identical momentary fish delivery speed which is adapted in particular to the conveyor chain speed.

The fish transfer system 2 can, as shown, be configured in such a manner that the operation of the fish feed-in device 1 is controlled with a control sign S2, for example a conveying signal, which is taken from the fish processing device 7. In particular, the control signal S2 is a control cycle signal corresponding to a conveying cycle of the processing conveying means 71. The control signal S2 is generally obtained by a signal transmitter, not shown, which, for example, detects the speed of the fish carrier elements 72 and/or their chronological passing of the fish receiving point 73 or the transfer area 420. The control system can also be configured such that the controlled opening and closing of the flap element 621 of the loading device 62, which is operated in particular by the actuators 622, is carried out in sync with the processing conveying means 71 of the fish processing device 71. Instead of a direct control connection to the fish processing device 7, the electrical control means 5 can be operated with at least one control parameter for specifying at least one control variable corresponding to the control signal S2, said control parameter being assigned in a defined manner to an operational/functional configuration of the fish processing device 7 for transfer of the fish.

The fish processing device 7 can generally be equipped with a receiving sensor means 76, shown only in dash-dotted lines in FIG. 1, which monitors receipt of the fish at the fish receiving point 73. Then, for example, a control connection is established to the electrical control means 5 in such a manner that in the event of a fish transfer to a fish carrier element 72 not being carried out, the delivery conveying means 3 is controlled and operated in such a manner that the fish 9 is held at the fish delivery point 42 until the associated release for transfer to a subsequent fish carrier element 72. A special feature can generally consist in that the fish delivery point 42 is temporarily or permanently offset, in particular in the direction towards the fish processing device 7. Such a controlled offset is executed in that the fish 9 which is still held by the delivery conveying means 3 is conveyed forwards or backwards a short distance, not leaving the crown region of the deflection roller 72, by said delivery conveying means 3, the fish being conveyed again at a defined controlled speed, including a zero speed (new resting position).

The electrical control means 5 can generally be configured for operation during a fish receiving malfunction in such a manner that a fish not properly transferred at the fish receiving point 73 to a fish carrier element 72 is released for ejection from the conveying process at the fish delivery point 42 and discharged. For example, the control system in conjunction with a discharge means 77, shown only in dash-dotted lines in FIG. 1, can be configured in such a way that the fish 9 is discharged via the processing conveying means 71 by delivering the fish 9, without it being grasped by the fish carrier elements 72, to the processing conveying means 71 and moving it to the discharge means 77 which is arranged on the processing conveying means. An embodiment for the controlled discharge point also consists in that the support conveying element 32 in the region of the transfer section 321 or also the entire guide rail 14 is configured with a controllable discharge mechanism 323 for floor-side opening and ejection of a fish 9. Such a mechanism is shown schematically in FIG. 2D. The support conveying element 32 or the guide rail 14 is formed in two parts with base parts 322 which are arranged so as to be transversely movable with a mechanism 323 which can be controlled with the electrical control means 5 for opening and closing the conveyor floor. In the event of an operational malfunction or a fish transfer not being carried out, the floor is opened by actuating the mechanism 323 such that the fish 9 drops downwards out of the conveying path 100.

In particular, the following functions and process measures according to the invention emerge from the description above.

The fish 9 are brought individually into the holding/resting position at the deposit point 13 in a longitudinal orientation within the access area of the delivery conveying means 3 which is formed in particular by the flank conveyors 31. In the holding/resting position, the delivery conveying means 3 is out of engagement with the fish 9. The delivery conveying means 3 is controlled, in accordance with control variables which are converted into conveying control signals, by the control system of the electrical control means 5 into the conveying grasp of the fish 9 located in the holding/resting position. The fish 9 grasped in the holding/resting position is moved along the defined delivery conveying path 4 to the fish delivery point 42 and is there released for grasping at the precise time and at the precise position, advantageously also at a defined speed, by the fish carrier elements 72 of the fish processing device 7, wherein the delivery conveying movement and the release with the delivery time and the particularly defined momentary delivery speed, associated with each fish 9, are controlled in accordance with operation of the fish carrier elements 72 which pass the fish receiving point 73.

The invention claimed is:

1. A fish feed-in device, configured for the automatic serial receipt and delivery of fish for feeding the fish to a fish processing device, comprising a deposit space receiving each fish in the longitudinal position, a delivery conveying means, which grasps and holds the fish in said longitudinal position, with which the fish can be conveyed for successive delivery in the longitudinal position in a delivery conveying direction corresponding to the longitudinal position, characterized in that the delivery conveying means is arranged and designed for immediate access to a fish located in the deposit space and is configured with a controllable positioning drive and a controllable conveying drive, which are controllable with at least one conveying control signal that is definitive for feeding the fish in an adjusted manner to a conveying facility of a fish processing device, wherein the delivery conveying means can be moved by the controllable positioning drive into a first state released by the fish in the deposit space, into a grasping second state for grasping, centred holding and conveying of the fish in the deposit space and, in cooperation with the controllable conveying drive, into a third state which releases the fish, after conveying, at a fish delivery point which is defined by a controlled delivery time with associated controlled fish delivery speed.

2. The fish feed-in device according to claim 1, characterized in that the positioning drive and the conveying drive of the fish feed-in device are connected to an electrical control means, which can be actuated by at least one said conveying control signal and which controls the discharge speed and the discharge time of each fish.

3. The fish feed-in device according to claim 1, characterized in that the fish delivery point is determined by a delivery conveying path which starts at a reference point that is assigned to a uniform fish position and ends with a defined conveying length at the fish delivery point.

4. The fish feed-in device according to claim 3, characterized in that a position sensor means is assigned to the reference point, which position sensor means determines the position of a defined body point common to all fish for each fish and generates a corresponding said conveying control signal.

5. The fish feed-in device according to claim 4, characterized in that the position sensor means is configured for detecting uniform access points of the fish which are assigned to the common body points, said access points being graspable with a processing conveying means of a fish processing device.

6. The fish feed-in device according to claim 1, characterized in that the delivery conveying means has two conveying elements which are formed by a pair of flank conveyors, which are adjustable in distance by the positioning drive and can be moved apart into an opening distance transverse to the fish conveying direction to establish the first state and the third state and can be moved towards each other into a closing distance transverse to the fish conveying direction to establish the second state, wherein in the second state they come to rest against the flanks of a fish in such a manner that the fish come to lie in a position with an upright fish symmetry plane.

7. The fish feed-in device according to claim 1, characterized in that the deposit space has a deposit means which is formed by a collecting means with a resting point which receives a single fish at which the fish comes to rest during the first state and also on establishing and reaching the second state of the delivery conveying means.

8. The fish feed-in device according to claim 1, characterized in that the deposit space has a profile adapted to a cross-sectional profile of the fish, by which the fish can be placed in a centred position with an upright fish symmetry plane.

9. The fish feed-in device according to claim 1, characterized in that the delivery conveying means has a support conveying element arranged along it which supports and orients the fish during delivery conveying.

10. The fish feed-in device according to claim 1, characterized in that the fish feed-in device has a guiding device which orients the fish for delivery and during delivery.

11. The fish feed-in device according to claim 10, characterized in that the guiding device is formed by a sliding guide rail.

12. The fish feed-in device according to claim 10, characterized in that the guide device has an upper guiding device which is formed by two mutually opposing sliding guide walls.

13. The fish feed-in device according to claim 10, characterized in that the guide device is designed with a discharge mechanism which delivers the fish before or at the fish delivery point, controlled by the fish feed-in device in the event of an operational malfunction.

14. The fish feed-in device according to claim 1, characterized in that the fish feed-in device has a transfer section which protrudes freely on the delivery conveying means.

15. The fish feed-in device according to claim 1, characterized in that the fish feed-in device is connected to a controllable loading device which is designed for serially conveying fish into the deposit space.

16. The fish feed-in device according to claim 1, characterized in that the fish feed-in device, for loading the deposit space with fish, has a loading means which is formed by a load conveyor that opens into the deposit space and is configured in such a manner that the fish conveyed up to it for loading can be conveyed into the deposit space individually and successively with a direction-oriented longitudinal position.

17. A fish transfer system, configured for serially transferring fish to a fish processing device, comprising a fish feed-in device and a processing conveying means, which serially transfers the fish from the fish feed-in device at a fish receiving point, said processing conveying means having fish carrier elements spaced along a processing conveying path, said carrier elements each being configured at the fish receiving point for receiving, and along the processing conveying path for transporting a fish, wherein a fish delivery point of the fish feed-in device is assigned to the fish receiving point, characterized in that the fish feed-in device is formed by the fish feed-in device equipped with the delivery conveying means according to claim 1.

18. The fish transfer system according to claim 17, characterized in that the electrical control means is configured in such a way that the at least one conveying control signal detects the speed of the fish carrier elements as well as their chronological passing of the fish receiving points.

19. The fish transfer system according to claim 18, characterized in that a receiving sensor means connected to the electrical control device is arranged at the fish receiving point, said sensor observing the fish transfer and transmitting a corresponding fault control signal in the event of a malfunction.

20. The fish transfer system according to claim 18, characterized in that a discharge means connected to the electrical control device is arranged on the processing conveying means, said discharge means discharging a fish which is conveyed by the processing conveying means but is in the wrong position.

21. The fish transfer system according to claim 17, characterized in that the electrical control means is configured in such a manner that the fish delivery speed at the fish delivery point is correlated with the speed of an associated fish carrier element at the fish receiving point.

22. The fish transfer system according to claim 17, characterized in that a transfer section is configured between the delivery conveying means and the fish receiving point, said transfer section orienting the fish, while it is being conveyed by the delivery conveying means, to an associated said carrier element at the fish receiving point.

23. A method for automatically feeding feed to a fish processing device, wherein the fish are brought individually into a holding position with longitudinal orientation at a deposit point and are conveyed with a delivery conveying means along a delivery conveying path and at a fish delivery point are serially fed to an associated fish receiving point, the fish passing the fish carrier elements of a processing conveying means of the fish processing device for transferring the fish, characterized in that the fish are brought into the holding position individually at the deposit point within a grasping region of the delivery conveying means, wherein in the holding position they are initially out of engagement with said delivery conveying means such that the delivery conveying means is controlled by an electrical control system in compliance with at least one conveying control signal into a conveying grasp of the fish located in the holding position and that the fish caught in the holding position is moved along the delivery conveying path to the fish delivery point and is there released, wherein the conveying grasp, the delivery conveying movement and the release are electrically controlled with a delivery time and a delivery speed, associated with each fish, that is consistent with the fish carrier elements which pass the fish receiving point.

24. The method according to claim 23, characterized in that the fish, while being conveyed with the delivery conveying means, are oriented on carrier elements of the processing conveying means of a fish processing device.

25. The method according to claim 23, characterized in that the delivery speed at the fish delivery point is adapted to at least one associated passing speed of the carrier elements at the fish receiving point.

26. The method according to claim 23, characterized in that the delivery conveying path terminates at the fish delivery point and starts with a path beginning defining a reference point, wherein a fish body point, which is common to all fish, is detected by a position sensor means with respect to the path beginning.

27. The method according to claim 23, characterized in that a fish feed-in device is used, wherein the fish feed-in device, configured for the automatic serial receipt and delivery of fish for feeding the fish to a fish processing device, comprises a deposit space receiving each fish in the longitudinal position, a delivery conveying means, which grasps and holds the fish in said longitudinal position, with which the fish can be conveyed for successive delivery in the longitudinal position in a delivery conveying direction corresponding to the longitudinal position, characterized in that the delivery conveying means is arranged and designed for immediate access to a fish located in the deposit space and is configured with a controllable positioning drive and a controllable conveying drive, which are controllable with at least one conveying control signal that is definitive for feeding the fish in an adjusted manner to a conveying facility of a fish processing device, wherein the delivery conveying means can be moved by the controllable positioning drive into a first state released by the fish in the deposit space, into a grasping second state for grasping, centred holding and conveying of the fish in the deposit space and, in cooperation with the controllable conveying drive, into a third state which releases the fish, after conveying, at a fish delivery point which is defined by a controlled delivery time with associated controlled fish delivery speed.

28. The method according to claim 26, characterized in that the fish pass the position sensor means on detection of the fish body point.

29. The method according to claim 23, characterized in that the controlled delivery of the fish at the fish delivery point is operated, at least temporarily, intermittently in such a manner that the fish delivery speed at the time of delivery is zero or lower than or higher than the processing conveying speed.

30. The method according to claim 23, characterized in that the fish receiving at the fish receiving point is detected by a receiving sensor means cooperating with the control system and, in the event that a fish is not received by a fish carrier element, the delivery conveying means is controlled and operated in such a manner that the fish is held at the fish delivery point until the associated release for receipt by a subsequent fish carrier element, in particular with an offset of the fish delivery point.

31. The method according to claim 23, characterized in that a non-receipt or a mis-receipt of a fish by a fish carrier element at the fish receiving point is detected in conjunction with discharging the fish out of the conveying process.

* * * * *